UNITED STATES PATENT OFFICE 2,677,217

METHOD FOR THE PRODUCTION OF BEAN SPROUTS

Charles F. Pentler and Fumiko Murayama,
San Francisco, Calif.

No Drawing. Application September 21, 1951,
Serial No. 247,762

5 Claims. (Cl. 47—14)

This invention relates to a method of producing seed sprouts and has particular reference to the sprouting of mung beans (*Phaseolus aureus*), or soy beans (*Glycine Max*), or, in fact, any other type of seed which may be used with our method.

A further object is to provide treatment of seeds from the dry state to the sprouted state in a minimum amount of time, under ideal sprouting conditions, carried out in the absence of light (etiolated), whereby the hypocotyl length of the sprout is greatly increased, the development of leaves and chlorophyll suppressed, together with a strong "beany" flavor, and to also provide means whereby the seed coats (testae) are removed and floated away.

Sprouts, such as bean sprouts, have long been a favored food in many countries, such as Japan, China and other far eastern countries, which food product has rapidly spread to other countries, so that sprouts are now universally used throughout the world.

In order to sprout beans (and when the word "beans" is used, it is understood to cover any type of seed which can be used and sprouted in the manner to be described) it is required that both water and oxygen be present, and in order to improve the quality as to taste, the sprouting has to be done without the presence of light, which would tend to develop chlorophyll and objectionable flavor.

In other words, beans can be stored for long periods of time in the absence of water. Therefore, in order to cause germination, the beans must be dampened so that oxygen can be absorbed, together with the water.

It has been customary, heretofore, to spread the beans upon mats and to then sprinkle them frequently with water. Care must be used with this method to avoid the addition of excessive amounts of water at any one time, as this would prevent the access of oxygen to the seedlings.

It is therefore evident that this method requires considerable labor and frequent attention, with the possibiliy of failure if not properly handled.

Our method of treating the seeds consists in submerging the seeds in a tank of water under conditions of controlled aeration and temperature and in the absence of light.

With our method of treating seeds, due to the buoyancy of the seeds and the sprouts in the water, there is no danger of the seeds or sprouts crushing each other, thus causing the sprouts to turn brown or reddish in color.

In the old method, if the sprouts became piled one upon the other to any extent, the sprouts would become bruised and discolored. Thus, the growing of the sprouts in water has a very distinct value in that considerable quantities can be grown in a more confined area than could otherwise be produced in that area.

We have found that by heavy aeration of the water in the tank and by maintaining a temperature of the water between substantially 60 and 100 degrees, that the average seeds will germinate to an edible condition in approximately 2 or 3 days, that their seed coats will be split and separated from the seeds by the flow of water within the tank, which flow is set up by the air stream used in the aeration.

It is also apparent that the production of bean sprouts under conditions of complete submersion will prevent the development of spoilage due to air-borne or other micro-organisms which come in contact with seeds grown on mats; that the seeds cannot become dehydrated or shriveled; that the sprouts require less attention than with the old method.

We have also found that with the submerged method, branch roots and root hairs are largely suppressed, which is not true with the open air method.

Further, with the open air method, the seed coats at times become dry and adhere to the sprouts, which result is impossible with our submerged method.

Further, any ungerminated seeds will settle to the bottom of the tank and therefore may be easily separated from the sprouts.

It is important that a very rapid and continuous supply of air should be furnished to the tank at a point preferably close to the bottom, so that the water within the tank will be agitated and heavily charged with oxygen, which in turn, may be absorbed by the beans.

Having thus described our invention, we claim:

1. A method of growing edible seed sprouts substantially in the absence of light comprising completely submerging the seed in water and in the absence of open air during sprout growth, continuously aerating the water during sprout growth, and maintaining the temperature of the water in which the sprouts grow at a temperature between substantially 60° F. and 100° F.

2. A method of producing the growth of edible seed sprouts substantially in the absence of light comprising completely submerging the seed in water during sprout growth, agitating and charging the water in which the sprouts are submerged with oxygen, and maintaining the water in which the sprouts grow at a temperature between substantially 60° F. and 100° F.

3. A method of producing edible seed sprouts comprising completely submerging the seed in water, maintaining the water at about 80° F. during seed sprout growth, aerating the water to supply oxygen to the growing sprouts, effecting separation of the seed coats, and separating ungerminated seeds from the sprouts.

4. In the method of claim 1, the step of removing the seed coats during sprout growth.

5. In the method of claim 2, the step of separating ungerminated seeds from growing sprouts.

References Cited in the file of this patent
UNITED STATES PATENTS

| Number | Name | Date |
|---|---|---|
| 891,176 | Von der Kammer | June 16, 1908 |
| 987,805 | Von der Kammer | Mar. 28, 1911 |
| 2,198,150 | Barnhart | Apr. 23, 1940 |
| 2,436,652 | Lee | Feb. 24, 1948 |
| 2,522,409 | Stoller | Sept. 12, 1950 |
| 2,522,798 | Persha et al. | Sept. 19, 1950 |